United States Patent
Yan et al.

(10) Patent No.: US 10,652,049 B2
(45) Date of Patent: May 12, 2020

(54) CELL-SPECIFIC REFERENCE SIGNAL GENERATION IN A WIRELESS COMMUNICATION SYSTEM

(71) Applicant: Lenovo Innovations Limited (Hong Kong), Hong Kong (CN)

(72) Inventors: Zhi Yan, Beijing (CN); Zukang Shen, Beijing (CN)

(73) Assignee: Lenovo Innovations Limited (Hong Kong), Hong Kong (CN)

(*) Notice: Subject to any disclaimer, the term of this patent is extended or adjusted under 35 U.S.C. 154(b) by 97 days.

(21) Appl. No.: 15/402,010

(22) Filed: Jan. 9, 2017

(65) Prior Publication Data

US 2017/0237584 A1    Aug. 17, 2017

(30) Foreign Application Priority Data

Jan. 9, 2016   (WO) ................ PCT/CN2016/070535

(51) Int. Cl.
*H04L 5/00*     (2006.01)
*H04L 25/02*    (2006.01)
(Continued)

(52) U.S. Cl.
CPC ...... *H04L 25/0224* (2013.01); *H04J 11/0073* (2013.01); *H04J 11/0079* (2013.01);
(Continued)

(58) Field of Classification Search
CPC . H04W 4/70; H04W 72/042; H04W 72/0453; H04W 72/0446; H04W 72/048; H04W 72/02; H04W 28/021; H04W 72/044; H04L 5/0053; H04L 25/0202; H04L 5/005; H04L 5/0073; H04L 5/0007;
(Continued)

(56) References Cited

U.S. PATENT DOCUMENTS

2017/0180095 A1*  6/2017  Xue ...................... H04L 5/0048
2018/0227148 A1*  8/2018  Chatterjee ............... H04L 5/005
(Continued)

FOREIGN PATENT DOCUMENTS

CN    102769593 A    11/2012
CN    104081852 A    10/2014

OTHER PUBLICATIONS

3GPP, "3rd Generation Partnership Project: Technical Specification Group Radio Access network: Evolved Universal Terrestrial Radio Access (E-UTRA): Physical channels and modulation(Release 13)", 3GPP TS 36.211 V13.0 0 (Dec. 2015), Dec. 31, 2015 (Dec. 31, 2015), section 6.10.1, pp. 92-95.
(Continued)

*Primary Examiner* — Jae Y Lee
*Assistant Examiner* — Aixa A Guadalupe Cruz
(74) *Attorney, Agent, or Firm* — Kunzler Bean & Adamson

(57) ABSTRACT

Apparatuses, methods, and systems are disclosed for cell-specific reference signal generation. One apparatus includes a processor that determines a NB-IoT CRS frequency offset. The processor may determine a first CRS sequence based on the NB-IoT CRS frequency offset. The processor may also determine a first time-frequency resource set. The apparatus may also include a transmitter that transmits the first CRS sequence on the first time-frequency resource set.

28 Claims, 8 Drawing Sheets

(51) Int. Cl.
  *H04L 27/26* (2006.01)
  *H04J 11/00* (2006.01)
  *H04W 4/70* (2018.01)
  *H04W 72/04* (2009.01)

(52) U.S. Cl.
  CPC .......... *H04L 5/005* (2013.01); *H04L 27/2613* (2013.01); *H04L 5/0007* (2013.01); *H04W 4/70* (2018.02); *H04W 72/0446* (2013.01); *H04W 72/0453* (2013.01)

(58) Field of Classification Search
  CPC ............. H04L 27/2657; H04L 27/2675; H04L 25/0224; H04L 27/2613; H04L 27/2662; H04L 27/2666; H04J 11/0069; H04J 11/0073; H04J 11/0076; H04J 11/0079
  See application file for complete search history.

(56) References Cited

U.S. PATENT DOCUMENTS

2018/0287845 A1* 10/2018 Kim .................. H04W 4/70
2019/0013913 A1*  1/2019 Suzuki ............... H04J 11/00
2019/0058559 A1*  2/2019 Liu .................. H04W 72/04

OTHER PUBLICATIONS

Nokia Networks et al., "In-band operation for NB-OIT", 3GPP TSG-RAN WGI Meeting #82bis R1-155980, Oct. 9, 2015 (Oct. 9, 2015), section 2, p. 1.
PCT/CN2016/070535, PCT International Search Report & Written Opinion, dated Sep. 27, 2016.

* cited by examiner

CELL-SPECIFIC REFERENCE SIGNAL GENERATION IN A WIRELESS COMMUNICATION SYSTEM

FIELD

The subject matter disclosed herein relates generally to wireless communications and more particularly relates to cell-specific reference signal ("CRS") generation in a wireless communication system.

BACKGROUND

The following abbreviations are herewith defined, at least some of which are referred to within the following description.
3GPP Third Generation Partnership Project
ACK Positive-Acknowledgment
ANDSF Access Network Discovery and Selection Function
AP Access Point
APN Access Point Name
AS Access Stratum
BLER Block Error Ratio
BPSK Binary Phase Shift Keying
CAZAC Constant Amplitude Zero Auto Correction
CCA Clear Channel Assessment
CCE Control Channel Element
CP Cyclic Prefix
CQI Channel Quality Information
CSI Channel State Information
CRS Cell-Specific Reference Signal
CSS Common Search Space
DCI Downlink Control Information
DL Downlink
EDGE Enhanced Data Rates for Global Evolution
eNB Evolved Node B
EPDCCH Enhanced Physical Downlink Control Channel
E-RAB E-UTRAN Radio Access Bearer
ETSI European Telecommunications Standards Institute
E-UTRAN Evolved Universal Terrestrial Radio Access Network
FBE Frame Based Equipment
FDD Frequency Division Duplex
FDMA Frequency Division Multiple Access
FEC Forward Error Correction
GERAN GSM/EDGE Radio Access Network
GPRS General Packet Radio Service
GSM Global System for Mobile Communication
GTP GPRS Tunneling Protocol
HARQ Hybrid Automatic Repeat Request
H-PLMN Home Public Land Mobile Network
IoT Internet-of-Things
IP Internet Protocol
ISRP Inter-System Routing Policy
LAA Licensed Assisted Access
LBE Load Based Equipment
LBT Listen-Before-Talk
LTE Long Term Evolution
MCL Minimum Coupling Loss
MCS Modulation and Coding Scheme
MME Mobility Management Entity
MU-MIMO Multi-User, Multiple-Input, Multiple-Output
NACK or NAK Negative-Acknowledgment
NAS Non-Access Stratum
NB Narrowband
NBIFOM Network-Based IP Flow Mobility
NB-IoT Narrowband IoT
NB-PBCH Narrowband PBCH
NB-PCID Narrowband PCID
NB-PDCCH Narrowband PDCCH
NB-PDSCH Narrowband PDSCH
NB-PSS Narrowband PSS
NB-SSS Narrowband SSS
OFDM Orthogonal Frequency Division Multiplexing
PCell Primary Cell
PBCH Physical Broadcast Channel
PCID Physical Cell Identification ("ID")
PCO Protocol Configuration Options
PCRF Policy and Charging Rules Function
PDCCH Physical Downlink Control Channel
PDCP Packet Data Convergence Protocol
PDN Packet Data Network
PDSCH Physical Downlink Shared Channel
PDU Protocol Data Unit
PGW Packet Data Network Gateway
PHICH Physical Hybrid ARQ Indicator Channel
PLMN Public Land Mobile Network
PRACH Physical Random Access Channel
PRB Physical Resource Block
PSS Primary Synchronization Signal
PUCCH Physical Uplink Control Channel
PUSCH Physical Uplink Shared Channel
QoS Quality of Service
QPSK Quadrature Phase Shift Keying
RAB Radio Access Bearer
RAN Radio Access Network
RAR Random Access Response
RE Resource Element
RRC Radio Resource Control
RS Reference Signal
RX Receive
SC-FDMA Single Carrier Frequency Division Multiple Access
SCell Secondary Cell
SCH Shared Channel
SGW Serving Gateway
SIB System Information Block
SINR Signal-to-Interference-Plus-Noise Ratio
SR Scheduling Request
SSS Secondary Synchronization Signal
TAU Tracking Area Update
TBS Transport Block Size
TCP Transmission Control Protocol
TDD Time-Division Duplex
TDM Time Division Multiplex
TED Tunnel Endpoint Identification ("ID")
TX Transmit
UCI Uplink Control Information
UE User Entity/Equipment (Mobile Terminal)
UL Uplink
UMTS Universal Mobile Telecommunications System
V-PLMN Visited Public Land Mobile Network
WiMAX Worldwide Interoperability for Microwave Access
WLAN Wireless Local Area Network In wireless communications networks, a frame structure for LTE FDD may be used. A radio frame of 10 milliseconds ("ms") may include 10 subframes, each of which is 1 ms. Each subframe further may include two slots, each of which is 0.5 ms. Within each slot, a number of OFDM symbols may be transmitted. The transmitted signal in each slot on an antenna port may be described by a resource grid comprising $N_{RB}^{DL} N_{sc}^{RB}$ subcarriers and $N_{symb}^{DL}$ OFDM symbols, where $N_{RB}^{DL}$ is number of RBs in the DL (which is dependent on the transmission bandwidth of a cell); $N_{sc}^{RB}$ is the number of subcarriers in each RB; and each subcarrier occupies a certain frequency of size Δf. The values of $N_{sc}^{RB}$, Δf, and $N_{symb}^{DL}$ may depend on a cyclic prefix as shown in Table 1.

TABLE 1

| Configuration | | $N_{sc}^{RB}$ | $N_{symb}^{DL}$ |
|---|---|---|---|
| Normal Cyclic Prefix | Δf = 15 kHz | 12 | 7 |
| Extended Cyclic Prefix | Δf = 15 kHz | 12 | 6 |
| | Δf = 7.5 kHz | 24 | 3 |

In certain configurations, an antenna port may refer to a logical antenna port (i.e., it may not necessarily refer to a physical antenna or antenna element). Mapping between an antenna port and physical antenna element(s) may be implementation specific. In other words, different devices may have a different mapping of physical antenna element(s) to the same antenna port. A receiving device may assume that the signals transmitted on the same antenna port go through the same channel. Moreover, a receiving device cannot assume signals transmitted on different antenna ports go through the same channel.

Reference signals exist in the current LTE system. A reference signal ("RS") may be transmitted on an antenna port, and by using the RS, the receiver may estimate the channel which the data transmitted on the antenna port also experiences. Both cell-specific and UE-specific RSs exist in the current LTE system. While a cell-specific reference signal ("CRS") is common to all UEs in a cell, the UE specific reference signal of different UEs may be different. A UE may use the CRS for PBCH demodulation, PDCCH demodulation, PDSCH demodulation, and channel state information ("CSI") measurement.

In LTE, the DL CRS sequence and REs that are used to carry the CRS may be dependent on the cell's PCID. Before a UE is connected to a serving cell, the UE may perform a cell search procedure. Each cell may transmit a primary synchronization signal ("PSS") and a secondary synchronization signal ("SSS"), which collectively define the PCID of the cell. The UE may search for the PSS/SSS on a frequency raster of every 100 kilohertz ("kHz"). Once the UE detects the PSS/SSS, the UE then may know the PCID of the cell. Consequently, the UE may derive the CRS sequence and the time-frequency resources carrying each of the CRS sequence. Moreover, by detecting the PSS/SSS, the UE may further obtain the subframe synchronization (e.g., the subframe and slot timing) and CP type (e.g., either normal CP or extended CP) of the cell. After the UE obtains the PSS/SSS, the UE may demodulate the PBCH. In certain configurations, the CRS sequence may be used to demodulate the PBCH. In various configurations, the PBCH is transmitted in the center 6 PRBs of an LTE system bandwidth. Moreover, the UE may derive the CRS for PBCH demodulation irrespective of the system bandwidth.

NarrowBand IoT ("NB-IoT") specifies a radio access technology for cellular internet of things that addresses improved indoor coverage, support for massive number of low throughput devices, low delay sensitivity, ultra-low device cost, low device power consumption, and (optimized) network architecture.

NB-IoT may support the following different modes of operation: "Stand-alone operation" utilizing, for example, the spectrum currently being used by GERAN systems as a replacement of one or more GSM carriers; "Guard band operation" utilizing the unused resource blocks within an LTE carrier's guard-band; and "In-band operation" utilizing resource blocks within a normal LTE carrier.

An NB-IoT may support an RF and baseband bandwidth of 180 kHz, which is equivalent to one LTE Physical Resource Block ("PRB"). NB-IoT downlink may be based on orthogonal frequency division multiple access ("OFDMA"), with 15 kHz subcarrier spacing. Thus, for guard-band and in-band operations, NB-IoT may maintain orthogonality with adjacent LTE PRBs.

A cell supporting NB-IoT may transmit a NB-IoT synchronization signal, comprising a NB-IoT primary synchronization signal ("NB-PSS") and a NB-IoT secondary synchronization signal ("NB-SSS"). By detecting the NB-PSS/NB-SSS, a NB-IoT UE may derive the PCID of the NB-IoT cell ("NB-PCID"). For in-band NB-IoT operation, the NB-PCID may or may not be the same as the PCID of the LTE carrier. By detecting the NB-PSS/NB-SSS, the NB-IoT UE may also derive the subframe synchronization (e.g., the subframe and slot timing). By detecting the NB-PSS/NB-SSS, the NB-IoT UE may also derive one or more the following information: the CP type of the NB-IoT cell; and the operation mode of the NB-IoT cell.

After the NB-IoT UE detects the NB-PSS/NB-SSS and retrieves the necessary information (e.g. NB-PCID, subframe synchronization), the NB-IoT UE may obtain the PBCH of the NB-IoT cell ("NB-PBCH"). In order to obtain the NB-PBCH, the NB-IoT UE needs to know the RS (including the RS sequence and the time-frequency resources used to transmit the RS sequence) that can be used to demodulate the NB-PBCH, and the frequency location of the NB-PBCH.

BRIEF SUMMARY

Apparatuses for cell-specific reference signal generation are disclosed. Methods and systems also perform the functions of the apparatus. In one embodiment, the apparatus includes a processor that determines a NB-IoT CRS frequency offset. The processor may determine a first CRS sequence based on the NB-IoT CRS frequency offset. The processor may also determine a first time-frequency resource set. The apparatus may also include a transmitter that transmits the first CRS sequence on the first time-frequency resource set.

In certain embodiments, the NB-IoT CRS frequency offset is defined relative to one or more subcarriers. In some embodiments, the first CRS sequence is a subset of a second CRS sequence, and the subset of the second CRS sequence is determined based on the NB-IoT CRS frequency offset. In such embodiments, the second CRS sequence may be a CRS sequence of a LTE carrier. In some embodiments, the processor determines the first time-frequency resource set based on the NB-IoT CRS frequency offset. In various embodiments, the transmitter transmits a NB-IoT synchronization signal. In one embodiment, the processor determines the first CRS sequence based on a PCID derived from the NB-IoT synchronization signal. In certain embodiments, the processor determines the first time-frequency resource set based on a PCID derived from the NB-IoT synchronization signal. In various embodiments, the NB-IoT CRS frequency offset is fixed or predetermined. In some embodiments, the transmitter transmits a narrowband physical channel in a second time-frequency resource set.

One method for cell-specific reference signal generation includes determining a NB-IoT CRS frequency offset. The method also includes determining a first CRS sequence based on the NB-IoT CRS frequency offset. The method includes determining a first time-frequency resource set. The method also includes transmitting the first CRS sequence on the first time-frequency resource set.

Another apparatus for cell-specific reference signal generation includes a processor that determines a NB-IoT CRS frequency offset. The processor may determine a first CRS sequence based on the NB-IoT CRS frequency offset. The processor may also determine a first time-frequency resource set. The apparatus may also include a receiver that receives the first CRS sequence on the first time-frequency resource set.

In certain embodiments, the receiver receives a NB-IoT synchronization signal. In such embodiments, the processor may determine the first CRS sequence based on a PCID derived from the NB-IoT synchronization signal. In some embodiments, the processor may determine the first time-frequency resource set based on a PCID derived from the NB-IoT synchronization signal. In various embodiments, the receiver receives a narrowband physical channel within a second time-frequency resource set. In such embodiments, the processor may estimate a channel on the second time-frequency resource set based on the first CRS sequence and demodulate the narrowband physical channel based on the estimated channel.

Another method for cell-specific reference signal generation includes determining a NB-IoT CRS frequency offset. The method also includes determining a first CRS sequence based on the NB-IoT CRS frequency offset. The method includes determining a first time-frequency resource set. The method also includes receiving the first CRS sequence on the first time-frequency resource set.

A further apparatus includes a processor that determines an index for a NB-IoT channel. The processor may also determine a CRS sequence based on the index. The processor may determine a time-frequency resource. The apparatus also includes a transmitter that transmits the CRS sequence on the time-frequency resource.

In certain embodiments, the index is determined based on a NB-IoT carrier. In some embodiments, the index is determined based on a LTE carrier. In various embodiments, the index corresponds to a relative location in an LTE carrier CRS sequence. In one embodiment, the index is fixed or predetermined. In certain embodiments, the time-frequency resource includes multiple time-frequency resources. In some embodiments, the transmitter transmits a NB-IoT synchronization signal, and a PCID of an NB-IoT cell is derived from the NB-IoT synchronization signal. In various embodiments, the processor determines the CRS sequence based on a PCID of an NB-IoT cell.

A further method includes determining an index for a NB-IoT channel. The method also includes determining a CRS sequence based on the index. The method includes determining a time-frequency resource. The method also includes transmitting the CRS sequence on the time-frequency resource.

One apparatus includes a receiver that receives information via a NB-IoT channel. The apparatus also includes a processor that determines an index corresponding to the NB-IoT channel. The processor also determines a CRS sequence based on the index. The processor determines a time-frequency resource on which the CRS sequence is received. The processor also demodulates the information based on the CRS sequence.

In certain embodiments, the NB-IoT channel includes a NB-PBCH. In one embodiment, the receiver receives a first NB-IoT synchronization signal, the receiver receives a second NB-IoT synchronization signal, and the processor determines a PCID of an NB-IoT cell based on at least one of the first and second NB-IoT synchronization signals. In such an embodiment, the processor determines the CRS sequence based on the PCID of the NB-IoT cell.

One method includes receiving information via a NB-IoT channel. The method also includes determining an index corresponding to the NB-IoT channel. The method includes determining a CRS sequence based on the index. The method also includes determining a time-frequency resource on which the CRS sequence is received. The method includes demodulating the information based on the CRS sequence.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
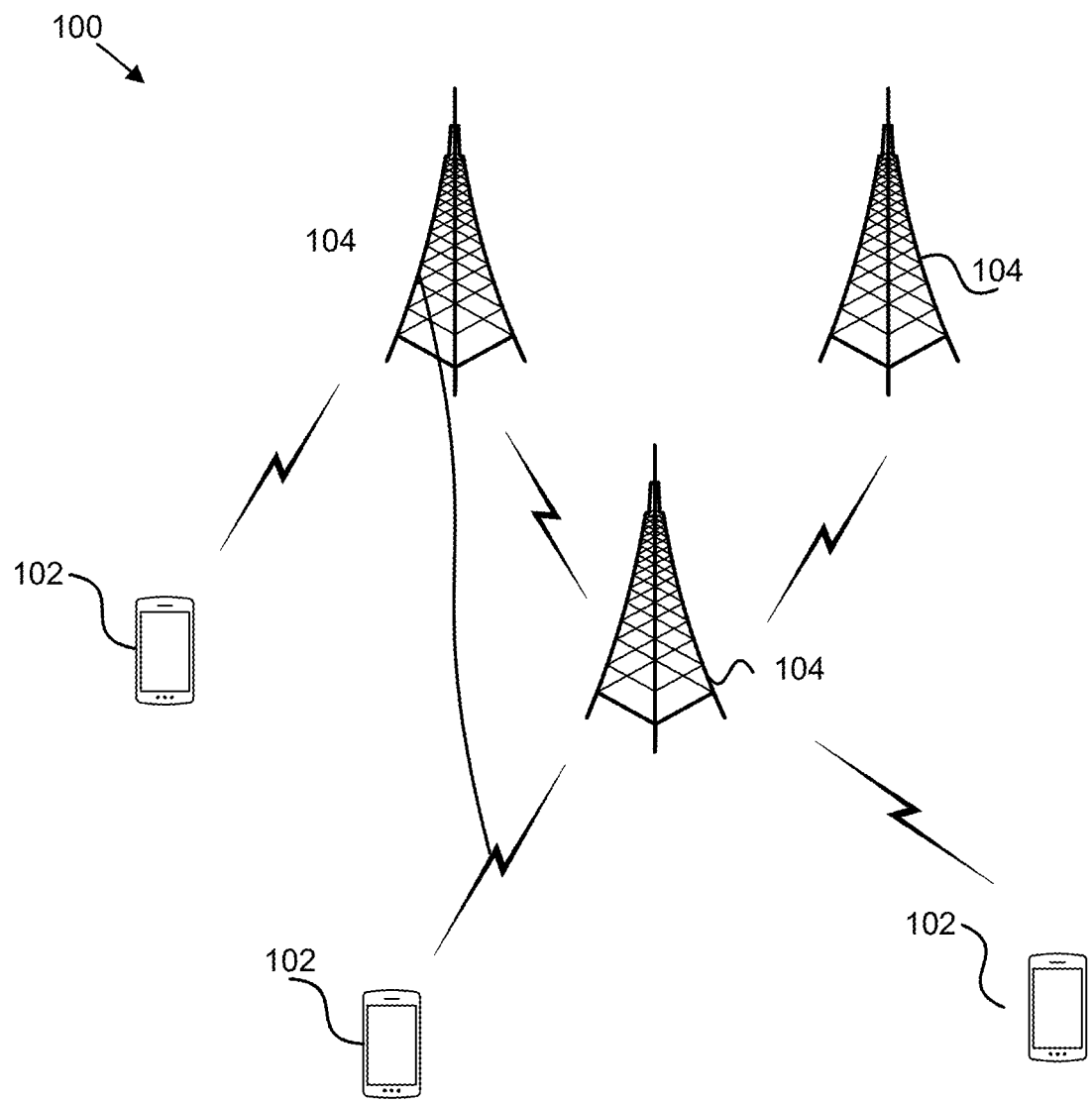
FIG. 1 is a schematic block diagram illustrating one embodiment of a wireless communication system for CRS generation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for CRS generation. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), low throughput devices, low delay sensitivity devices, ultra-low cost devices, low power consumption devices, an IoT device, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that may include one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. For example, one or more base units 104 may be communicably coupled to an MME, an SGW, and/or a PGW.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. In another implementation, the wireless communication system 100 is compliant with NB-IoT. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, an apparatus (e.g., base unit 104) may determine an index for a NB-IoT channel. The apparatus may also determine a CRS sequence based on the index. Moreover, the apparatus may determine a time-frequency resource and may transmit the CRS sequence on the time-frequency resource. In another embodiment, an apparatus (e.g., remote unit 102) may receive information via the NB-IoT channel. The apparatus may also determine the index corresponding to the NB-IoT channel. Moreover, the apparatus may determine the CRS sequence based on the index and determine the time-frequency resource on which the CRS sequence is received. The apparatus may also demodulate the information based on the CRS sequence. Accordingly, the NB-IoT channel may reuse a portion of a CRS sequence that is traditionally used for an entire LTE carrier, thereby reducing reference signal overhead used for the NB-IoT.

In a further embodiment, an apparatus (e.g., base unit 104) may determine a NB-IoT CRS frequency offset. The apparatus may also determine a first CRS sequence based on the NB-IoT CRS frequency offset. Moreover, the apparatus may determine a first time-frequency resource set and may transmit the first CRS sequence on the first time-frequency resource set. In another embodiment, an apparatus (e.g., remote unit 102) may determine the NB-IoT CRS frequency offset. Moreover, the apparatus may determine the first CRS sequence based on the NB-IoT CRS frequency offset and determine the first time-frequency resource set. The apparatus may also receive the first CRS sequence on the first time-frequency resource set. Accordingly, the NB-IoT channel may reuse a portion of a CRS sequence that is traditionally used for an entire LTE carrier, thereby reducing reference signal overhead used for the NB-IoT.

Figure 2:
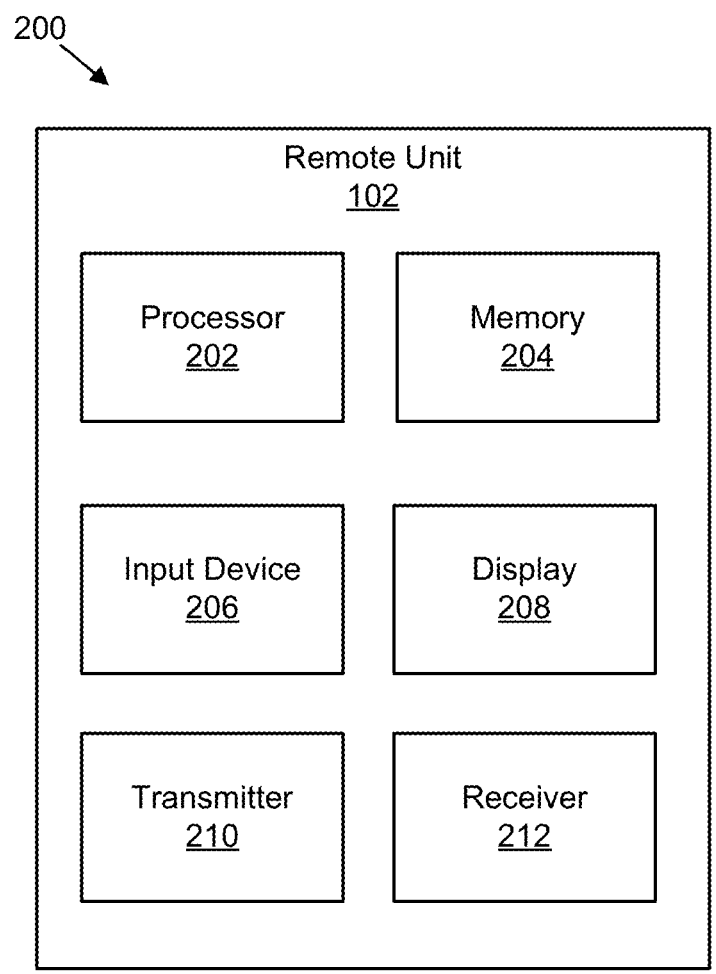
FIG. 2 is a schematic block diagram illustrating one embodiment of an apparatus that may be used for receiving a CRS sequence.

FIG. 2 depicts one embodiment of an apparatus 200 that may be used for receiving a CRS sequence. The apparatus 200 includes one embodiment of the remote unit 102.

Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may determine an index corresponding to a NB-IoT channel, determine a CRS sequence based on the index, determine a time-frequency resource on which the CRS sequence is received, and demodulate the information based on the CRS sequence. In some embodiments, the processor 202 may determine a NB-IoT CRS frequency offset, determine a first CRS sequence based on the NB-IoT CRS frequency offset, and determine a first time-frequency resource set.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an indication to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit feedback information and/or an indication to the base unit 104. In certain embodiments, the receiver receives information via a NB-IoT channel. In some embodiments, the receiver receives the first CRS sequence on a first time-frequency resource set. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
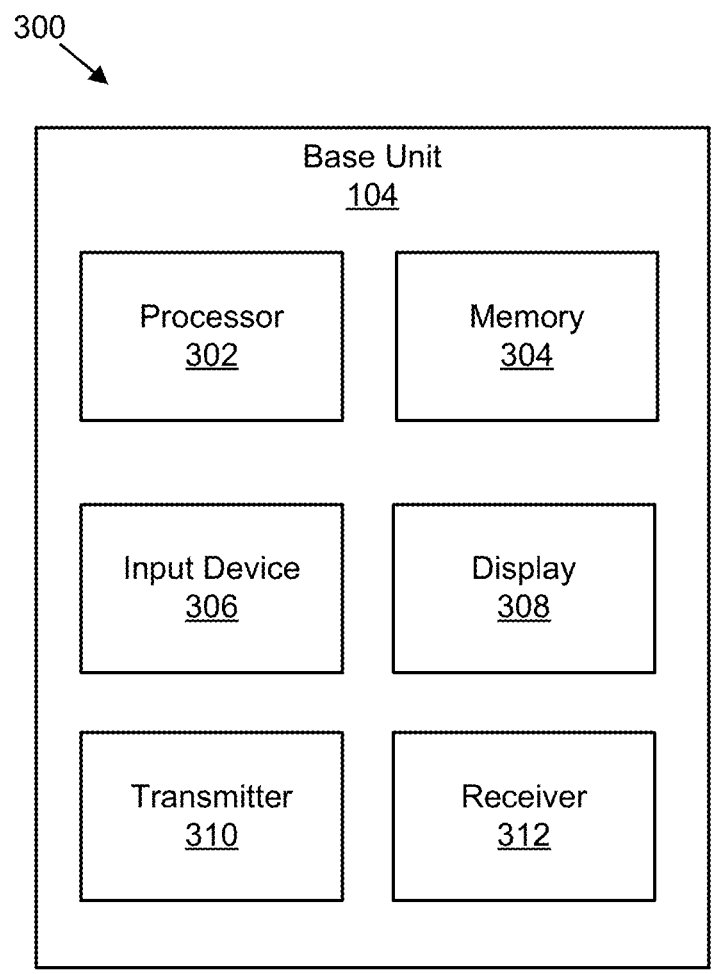
FIG. 3 is a schematic block diagram illustrating one embodiment of an apparatus that may be used for transmitting a CRS sequence.

FIG. 3 depicts one embodiment of an apparatus 300 that may be used for transmitting a CRS sequence. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively. In certain embodiments, the processor 302 may be used to determine an index for a NB-IoT channel, determine a CRS sequence based on the index, and determine a time-frequency resource. In some embodiments, the processor 302 may be used to determine a NB-IoT CRS frequency offset, determine a first CRS sequence based on the NB-IoT CRS frequency offset, and determine a first time-frequency resource set.

The transmitter 310 is used to provide DL communication signals to the remote unit 102 and the receiver 312 is used to receive UL communication signals from the remote unit 102. In certain embodiments, the transmitter 310 is used to transmit a CRS sequence on a time-frequency resource. In some embodiments, the transmitter 310 is used to transmit a first CRS sequence on a first time-frequency resource set. As may be appreciated, in certain embodiments, an MME, an SGW, and/or a PGW may include one or more components found in the base unit 104. Furthermore, in certain embodiments, the base unit 104 may represent one embodiment of an MME, an SWG or a PGW.

Figure 4:
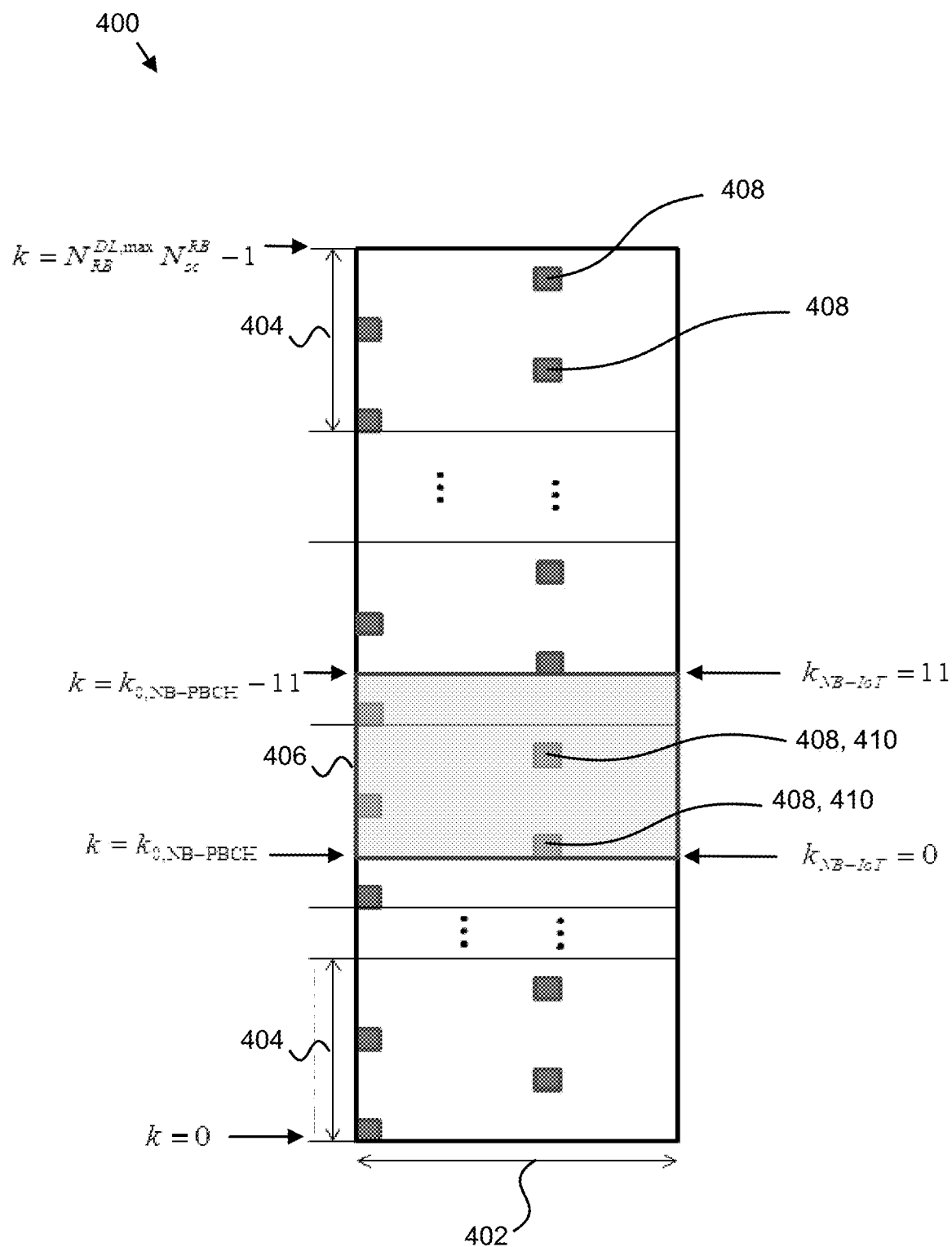
FIG. 4 illustrates one embodiment of time-frequency resources used to transmit a CRS sequence.

FIG. 4 illustrates one embodiment of time-frequency resources used to transmit a CRS sequence. The time-frequency resources used to transmit a CRS sequence may be within timeframe of a single slot 400. The illustrated slot

400 is transmitted over time 402 (e.g., 0.5 ms). An entire subcarrier range for the DL RBs is illustrated as various subcarriers k. A number of subcarriers $N_{RB}^{DL}N_{sc}^{RB}$ are illustrated from k=0 to k=$N_{RB}^{DL}N_{sc}^{RB}$−1. An RB 404 may include 12 subcarriers, in one embodiment (e.g., while $N_{sc}^{RB}$=12). For NB-IoT, a single RB 406 may be used. Moreover, for the entire subcarrier range, REs 408 may be used for a CRS sequence (e.g., legacy LTE CRS sequence). However, NB-IoT may only use REs 410 within RB 406 for its CRS sequence.

For an in-band NB-IoT operation mode, in order to reduce the interference from NB-IoT to legacy LTE, and vice versa, the subcarrier boundary of the NB-IoT transmission and the legacy LTE transmission may be aligned.

Therefore, the subcarrier indices used by a NB-PBCH transmission may denoted as k={$k_{0,NB\text{-}PBCH}$, $k_{0,NB\text{-}PBCH}$1, . . . , $k_{0,NB\text{-}PBCH}$+11} in ascending order of frequency, wherein $k_{0,NB\text{-}PBCH}$ denotes an subcarrier index in the LTE carrier with respect to a legacy LTE system. It is also possible to index the subcarriers used for NB-PBCH transmission by $k_{NB\text{-}IoT}$={0, 1, . . . , 11} in ascending order of frequency, which is viewed with respect to a 180 kHz NB-IoT carrier perspective as illustrated.

In certain embodiments, and as used in this disclosure for example purposes, NB-PBCH is transmitted in 12 subcarriers, which are consecutive in frequency to form a 180 kHz bandwidth for a narrowband physical channel transmission (e.g., NB-IoT channel). For simplicity, the set of 12 subcarriers used for a NB-PBCH transmission is referred to as the NB-PBCH subcarriers. As may be appreciated, the embodiments described herein may be extended to embodiments in which the NB-PBCH is transmitted in a subset of the 12 consecutive subcarriers constituting the 180 kHz NB-IoT transmission.

For an in-band NB-IoT operation, to reuse the legacy LTE CRS to demodulate the NB-PBCH, a NB-IoT UE needs to derive the legacy LTE CRS sequence segment and the legacy CRS frequency location in the NB-PBCH REs. This may be done by $k_{0,NB\text{-}PBCH}$ determination and CRS for NB-PBCH generation.

$k_{0,NB\text{-}PBCH}$ determination.

The value of the $k_{0,NB\text{-}PBCH}$ may fixed to a single value or predetermined in some manner (e.g., via signaling, specification, etc.) which is known by a NB-IoT UE before demodulating the NB-PBCH. In certain embodiments, $k_{0,NB\text{-}PBCH}$ is in a range from 0 to 1308 which represents an entire maximal system bandwidth. In one embodiment, $k_{0,NB\text{-}PBCH}$ may be fixed to 640 (which has a 20 subcarrier distance from a DC subcarrier of an LTE system). In another embodiment, $k_{0,NB\text{-}PBCH}$ may be determined by NB-PCID which may be derived from NB-PSS and/or NB-SSS detection. For example, if NB-PCID is an even value, $k_{0,NB\text{-}PBCH}$=640, else $k_{0,NB\text{-}PBCH}$=680.

In the illustrated embodiment, $k_{0,NB\text{-}PBCH}$ is a frequency position distance indicating the frequency position of NB-IoT relative to a legacy LTE system. Moreover, the relative frequency subcarrier of NB-IoT to the subcarrier of LTE system is based on the lowest frequency index of the entire system bandwidth, so $k_{0,NB\text{-}PBCH}$ is in a range from 0 to 1308.

In certain embodiments, $k_{0,NB\text{-}PBCH}$ is defined as a unit of more than one subcarrier, for example, $k_{0,NB\text{-}PBCH}$ may be defined as a unit of 12 subcarriers (e.g., 1 physical resource block frequency length).

CRS for NB-PBCH Generation

The NB-IoT UE determines the legacy LTE CRS sequence and time-frequency resources in the NB-PBCH subcarriers using the values of $k_{0,NB\text{-}PBCH}$ and $N_{ID,NB\text{-}IoT}^{cell}$, wherein $N_{ID,NB\text{-}IoT}^{cell}$ denotes the PCID of the NB-IoT cell which are determined using the corresponding NB-PSS and/or NB-SSS of the NB-IoT cell.

By using $k_{0,NB\text{-}PBCH}$ determination and CRS for NB-PBCH generation, a NB-IoT UE may obtain the legacy LTE CRS sequence and time-frequency resources in the NB-PBCH REs. A NB-IoT UE may determine the reference signal used for NB-PBCH demodulation as using any suitable method. The following two embodiments are two possible examples for determining the reference signal.

Embodiment 1

In one embodiment, the reference signal used for NB-PBCH demodulation is described within the RE grid of the NB-IoT carrier. In other words, the subcarriers used for NB-PBCH transmission is indexed by $k_{NB\text{-}IoT}$={0, 1, . . . , 11} in ascending order of frequency. It is noted that in the NB-IoT carrier, the subcarrier index $k_{NB\text{-}IoT}$, ranges from 0 to 11.

The NB-IoT UE obtains the legacy LTE CRS sequence $r_{l,n_s}(m)$ by $$r_{l,n_s}(m) = \frac{1}{\sqrt{2}}(1-2\cdot c(2m)) + j\frac{1}{\sqrt{2}}(1-2\cdot c(2m+1)),$$

$$m = 0, 1, \ldots, 2N_{RB}^{max,DL}-1$$

where $n_s$ is the slot number within a radio frame and l is the OFDM symbol number within the slot. The pseudo-random sequence c(i) is defined in clause 7.2 of TS36.211. The pseudo-random sequence generator may be initialized with $c_{init}=2^{10}\cdot(7\cdot(n_s+1)+l+1)\cdot(2\cdot N_{ID,NB\text{-}IoT}^{cell}+1)+2\cdot N_{ID,NB\text{-}IoT}^{cell}+N_{CP}$ at the start of each OFDM symbol where $N_{ID,NB\text{-}IoT}^{cell}$ is the NB-IoT PCID, $N_{RB}^{max,DL}$ is the maximum bandwidth of downlink of LTE, for example $N_{RB}^{max,DL}$=110, and $$N_{CP} = \begin{cases} 1 & \text{for normal } CP \\ 0 & \text{for extended } CP \end{cases}$$

The reference signal sequence $r_{l,n_s}(m)$ may be mapped to complex-valued modulation symbols $a_{k_{NB\text{-}IoT},l}^{(p)}$ used as reference symbols for an antenna port p in slot $n_s$ according to $a_{k_{NB\text{-}IoT},l}^{(p)}=r_{l,n_s}(m')$ $$k_{NB-IoT} = 6m + (v + v_{shift} + (6-(k_{0,NB\text{-}PBCH}\bmod 6)))\bmod 6$$

$$l = \begin{cases} 0, N_{symb}^{DL}-3 & \text{if } p \in \{0,1\} \\ 1 & \text{if } p \in \{2,3\} \end{cases}$$

$$m = 0, 1$$

$$m' = m + \left\lceil \frac{k_{0,NB\text{-}PBCH}}{6} \right\rceil$$

The variables v and $v_{shift}$ define the position in the frequency domain for the different reference signals where v is given by $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

The cell-specific frequency shift is given by: $v_{shift} = N_{ID,NB-IoT}^{cell} \bmod 6$.

The NB-IoT UE then obtains the legacy LTE CRS sequence and time-frequency resources in the NB-PBCH REs, i.e. subcarrier indices $k_{NB-IoT} = \{0, 1, \ldots, 11\}$ in the NB-IoT carrier. As may be appreciated, for in-band NB-IoT operation, in order to get the same CRS sequence as in the LTE carrier, the NB-IoT cell's PCID may be the same as the LTE cell's PCID. It is noted that in this embodiment, the NB-IoT UE does not need to know the bandwidth of the LTE carrier.

Embodiment 2

In another embodiment, the reference signal used for NB-PBCH demodulation is described within the RE grid of the LTE carrier. In other words, the subcarriers used for NB-PBCH transmission is indexed by $k = \{k_{0,NB-PBCH}, k_{0,NB-PBCH}+1, \ldots, k_{0,NB-PBCH}+11\}$ in ascending order of frequency, where $k_{0,NB-PBCH}$ denotes a subcarrier index in the legacy LTE carrier assuming the maximum LTE carrier bandwidth.

The NB-IoT UE obtains the legacy LTE CRS sequence $r_{l,n_s}(m)$ by $$r_{l,n_s}(m) = \frac{1}{\sqrt{2}}(1 - 2 \cdot c(2m)) + j\frac{1}{\sqrt{2}}(1 - 2 \cdot (2m+1)),$$

$$m = 0, 1 \ldots, 2N_{RB}^{max,DL} - 1$$

where $n_s$ is the slot number within a radio frame and $l$ is the OFDM symbol number within the slot. The pseudo-random sequence $c(i)$ is defined in clause 7.2 of TS36.211. The pseudo-random sequence generator may be initialized with $c_{init} = 2^{10} \cdot (7 \cdot (n_s+1)+l+1) \cdot (2 \cdot N_{ID,NB-IoT}^{cell}+1)+2 \cdot N_{ID,NB-IoT}^{cell} + N_{CP}$ at the start of each OFDM symbol where $N_{ID,NB-IoT}^{cell}$ is the NB-IoT cell PCID, $N_{RB}^{max,DL}$ is the maximum bandwidth of downlink of LTE, for example $N_{RB}^{max,DL} = 110$, and $$N_{CP} = \begin{cases} 1 & \text{for normal } CP \\ 0 & \text{for extended } CP \end{cases}$$

The reference signal sequence $r_{l,n_s}(m)$ may be mapped to complex-valued modulation symbols $a_{k,l}^{(p)}$ used as reference symbols for antenna port p in slot $n_s$ according to $a_{k,l}^{(p)} = r_{l,n_s}(m')$ $$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{max,DL} - 1$$

$$m' = m$$

The variables v and $v_{shift}$ define the position in the frequency domain for the different reference signals where v is given by $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

The cell-specific frequency shift is given by: $v_{shift} = N_{ID,NB-IoT}^{cell} \bmod 6$.

The NB-IoT UE then obtains the legacy LTE CRS sequence and time-frequency resources in NB-PBCH REs, i.e. $\{k_{0,NB-PBCH}, k_{0,NB-PBCH}+1, \ldots, k_{0,NB-PBCH}+11\}$ in the legacy LTE carrier assuming the maximum LTE carrier bandwidth. As may be appreciated, for in-band NB-IoT operation, in order to get the same CRS as in the LTE carrier, the NB-IoT cell's PCID may be the same as the LTE cell's PCID. It is noted that in this embodiment, the NB-IoT UE does not need to know the bandwidth of the LTE carrier.

The above two embodiment may be used for in-band NB-IoT operation. Furthermore, the same embodiments may be applied to guard band and standalone NB-IoT operations. As may be appreciated, the restriction on having the same PCID for the NB-IoT carrier and the LTE carrier may only apply to the in-band NB-IoT operation, since there is no LTE carrier existing in the guard band and standalone NB-IoT operations.

In certain embodiments, the value of $k_{0,NB-PBCH}$ may be either fixed to a single value or predetermined, such as by using PCID of NB-IoT, irrespective of the NB-IoT operation mode. In some embodiments, a set of values may be defined: $k_{0,NB-PBCH}$, and either the NB-PSS or NB-SSS or the combination of NB-PSS/NB-SSS may determine the value of $k_{0,NB-PBCH}$ from the set of values.

The frequency location of the 180 kHz used for NB-PBCH transmission may be derived based on the detected NB-PSS/NB-SSS. In one embodiment, the frequency location of the 180 kHz used for NB-PBCH transmission is the same as the 180 kHz used for the NB-PSS/NB-SSS transmission. In another embodiment, there may be a fixed offset between the frequency location of the 180 kHz used for NB-PBCH transmission and the NB-PSS/NB-SSS transmission.

As may be appreciated, NB-PBCH is one example of narrowband physical channel transmission. However, other narrowband physical channel transmissions may be used, derived, determined, and/or detected similarly to how NB-PBCH is described herein. For example, other narrowband physical channel transmissions may include NB-PDCCH and NB-PDSCH.

Figure 5:
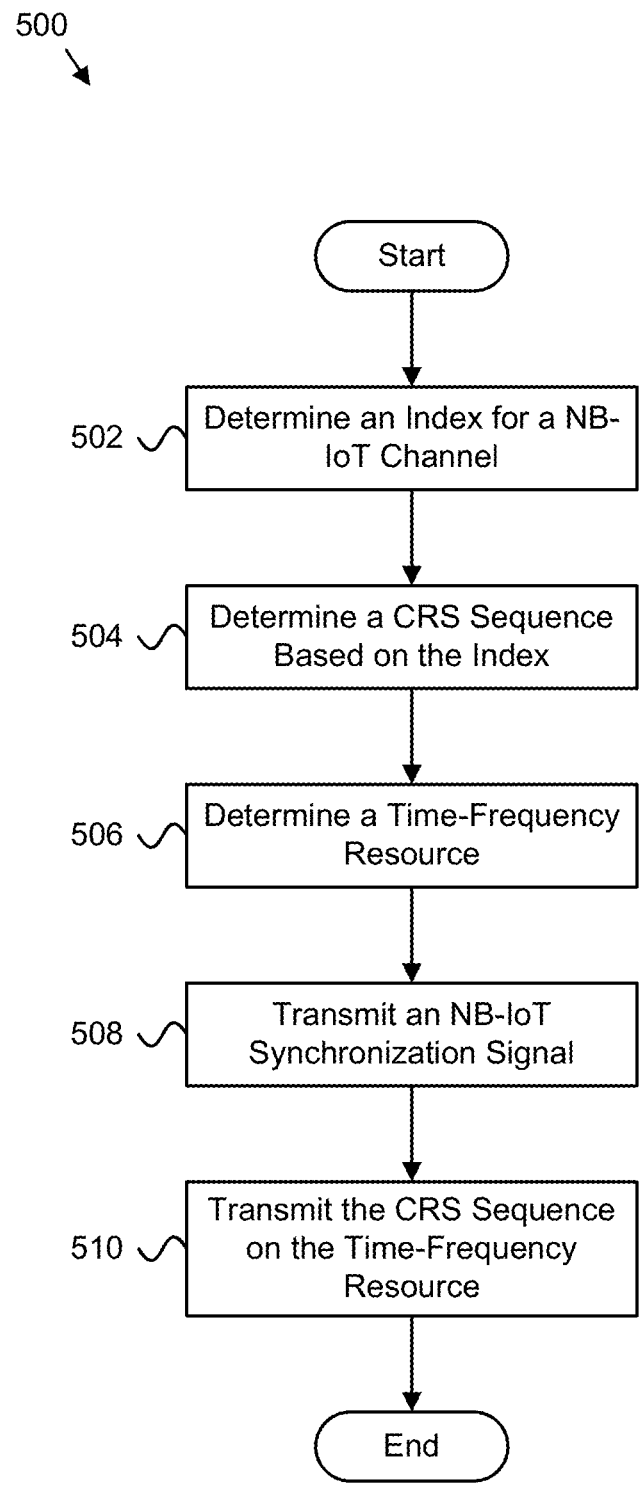
FIG. 5 is a schematic flow chart diagram illustrating one embodiment of a method for transmitting a CRS sequence.

FIG. 5 is a schematic flow chart diagram illustrating one embodiment of a method 500 for transmitting a CRS sequence. In some embodiments, the method 500 is performed by an apparatus, such as the base unit 104. In certain embodiments, the method 500 may be performed by a processor executing program code, for example, a microcontroller, a microprocessor, a CPU, a GPU, an auxiliary processing unit, a FPGA, or the like.

The method 500 may include determining 502 an index for a NB-IoT. In one embodiment, the index may be based on a NB-IoT carrier. In another embodiment, the index may be based on a LTE carrier. In certain embodiments, the index may correspond to a relative location in an LTE carrier CRS sequence. In some embodiments, the index is fixed or predetermined. The method 500 may include determining 504 a CRS sequence based on the index. In one embodiment, determining 504 the CRS sequence includes determining the CRS sequence based on a PCID of an NB-IoT cell.

The method 500 may include determining 506 a time-frequency resource. In one embodiment, the time-frequency resource includes multiple time-frequency resources. The method 500 may also include transmitting 508 a NB-IoT synchronization signal. In one embodiment, a PCID of an NB-IoT cell is derived from the NB-IoT synchronization signal. The method 500 may include transmitting 510 the CRS sequence on the time-frequency resource, and the method 500 may end.

Figure 6:
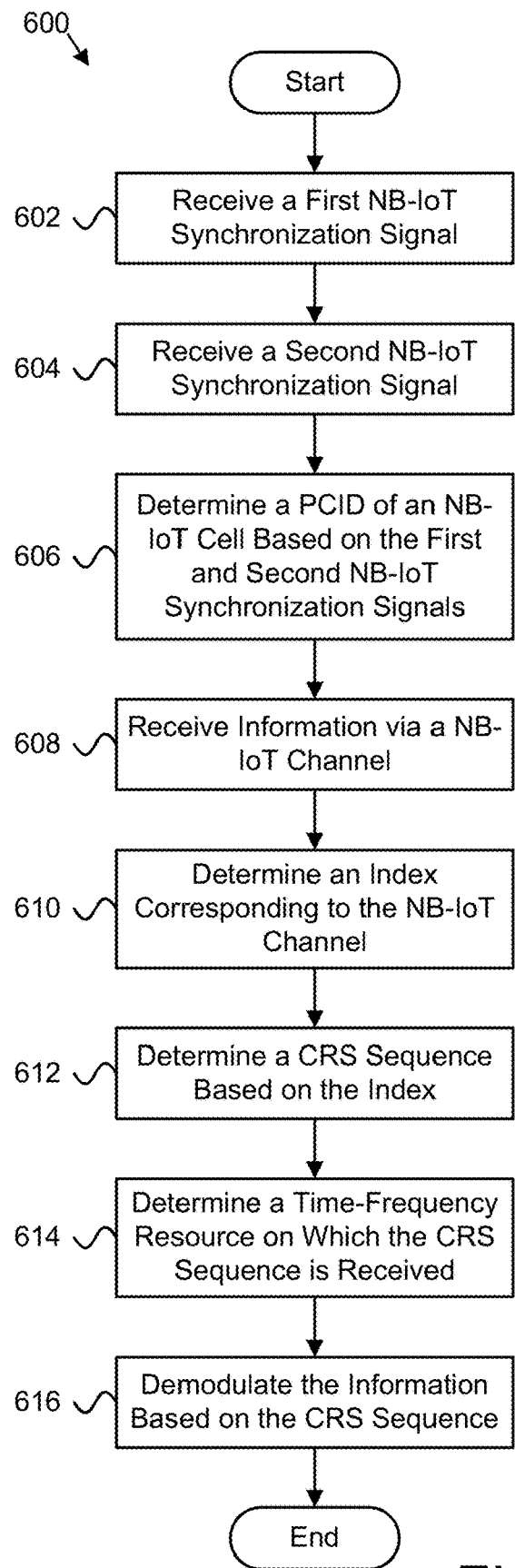
FIG. 6 is a schematic flow chart diagram illustrating one embodiment of a method for using a received CRS sequence.

FIG. 6 is a schematic flow chart diagram illustrating one embodiment of a method 600 for using a received CRS sequence. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include receiving 602 a first NB-IoT synchronization signal. The method 600 may also include receiving 604 a second NB-IoT synchronization signal. The method 600 may include determining 606 a PCID of an NB-IoT cell based on at least one of the first and second NB-IoT synchronization signals. The method 600 may also include receiving 608 information via a NB-IoT channel. In one embodiment, the NB-IoT channel includes a NB-PBCH. The method may include determining 610 an index corresponding to the NB-IoT channel. In one embodiment, the index may be based on a NB-IoT carrier. In another embodiment, the index may be based on a LTE carrier. In certain embodiments, the index may correspond to a relative location in an LTE carrier CRS sequence. In some embodiments, the index is fixed or predetermined. The method 600 may include determining 612 a CRS sequence based on the index. In one embodiment, determining 612 the CRS sequence includes determining the CRS sequence based on a PCID of an NB-IoT cell.

The method 600 may include determining 614 a time-frequency resource. In one embodiment, the time-frequency resource includes multiple time-frequency resources. The method 600 may also include demodulating 616 the information based on the CRS sequence, and the method 600 may end.

Figure 7:
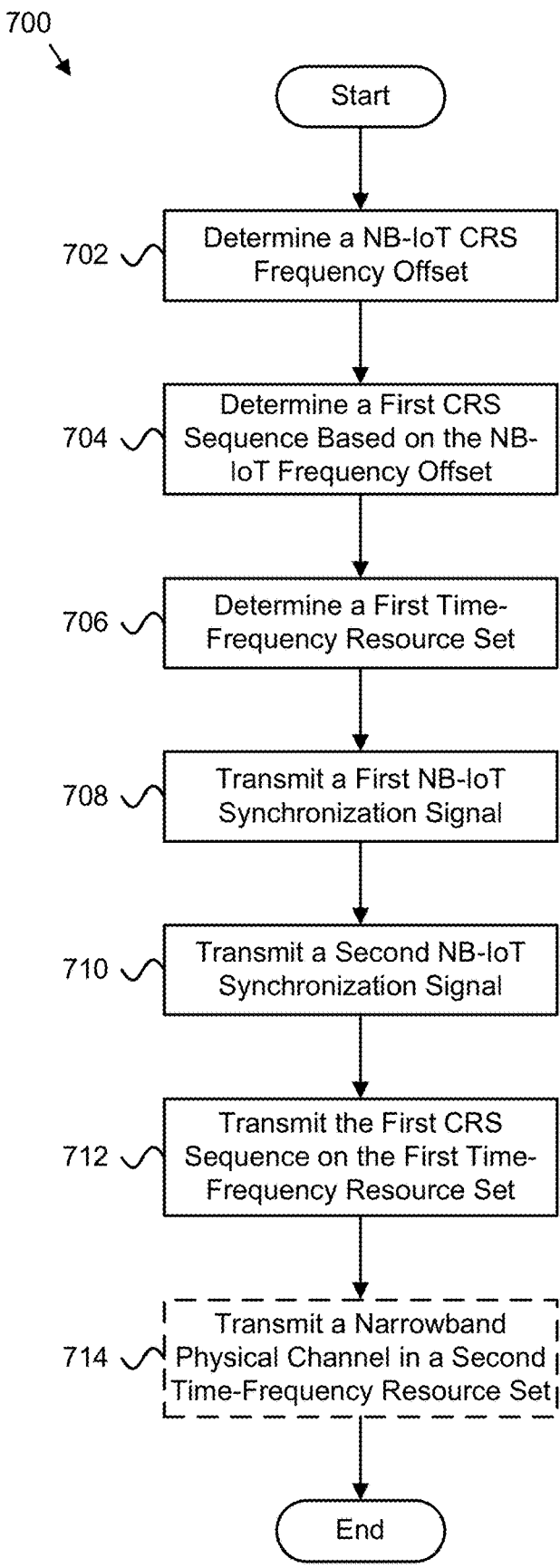
FIG. 7 is a schematic flow chart diagram illustrating another embodiment of a method for transmitting a CRS sequence.

FIG. 7 is a schematic flow chart diagram illustrating another embodiment of a method 700 for transmitting a CRS sequence. In some embodiments, the method 700 is performed by an apparatus, such as the base unit 104. In certain embodiments, the method 700 may be performed by a processor executing program code, for example, a microcontroller, a microprocessor, a CPU, a GPU, an auxiliary processing unit, a FPGA, or the like.

The method 700 may include determining 702 a NB-IoT CRS frequency offset. In one embodiment, the NB-IoT CRS frequency offset is defined relative to one or more subcarriers. In some embodiments, the NB-IoT CRS frequency offset is fixed or predetermined. The method 700 may include determining 704 a first CRS sequence based on the NB-IoT CRS frequency offset. In certain embodiments, the first CRS sequence is a subset of a second CRS sequence, and the subset of the second CRS sequence is determined based on the NB-IoT CRS frequency offset. In such embodiments, the second CRS sequence may be a CRS sequence of an LTE carrier. In some embodiments, determining 704 the first CRS sequence includes determining the first CRS sequence based on a PCID derived from an NB-IoT synchronization signal.

The method 700 may include determining 706 a first time-frequency resource set. In one embodiment, determining 706 the first time-frequency resource set includes determining the first time-frequency resource set based on the NB-IoT CRS frequency offset. In various embodiments, determining 706 the first time-frequency resource set includes determining the first time-frequency resource set based on a PCID derived from a NB-IoT synchronization signal. The method 700 may also include transmitting 708 a first NB-IoT synchronization signal. The method 700 may further include transmitting 710 a second NB-IoT synchronization signal. The method 700 may include transmitting 712 the first CRS sequence on the first time-frequency resource set. In one embodiment, the method 700 includes transmitting 714 a narrowband physical channel in a second time-frequency resource set, and the method 700 may end.

Figure 8:
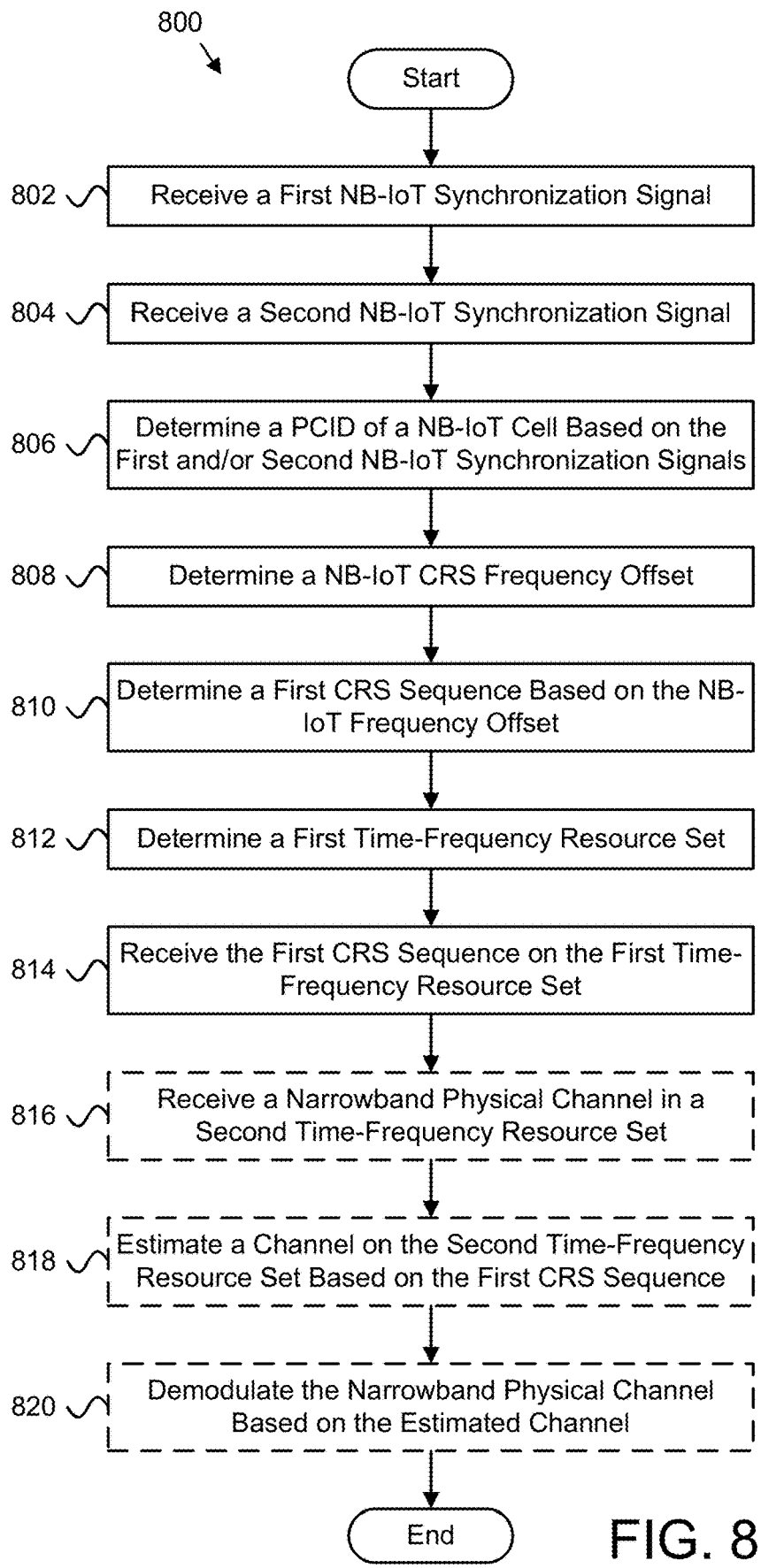
FIG. 8 is a schematic flow chart diagram illustrating one embodiment of a method for receiving a CRS sequence.

FIG. 8 is a schematic flow chart diagram illustrating one embodiment of a method 800 for receiving a CRS sequence. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include receiving 802 a first NB-IoT synchronization signal. The method 800 may also include receiving 804 a second NB-IoT synchronization signal. The method 800 may include determining 806 a PCID of an NB-IoT cell based on the first and/or second NB-IoT synchronization signals.

The method 800 may include determining 808 a NB-IoT CRS frequency offset. In one embodiment, the NB-IoT CRS frequency offset is defined relative to one or more subcarriers. In some embodiments, the NB-IoT CRS frequency offset is fixed or predetermined. The method 800 may include determining 810 a first CRS sequence based on the NB-IoT CRS frequency offset. In certain embodiments, the first CRS sequence is a subset of a second CRS sequence, and the subset of the second CRS sequence is determined based on the NB-IoT CRS frequency offset. In such embodiments, the second CRS sequence may be a CRS sequence of an LTE carrier. In some embodiments, determining 810 the first CRS sequence includes determining the first CRS sequence based on a PCID derived from an NB-IoT synchronization signal.

The method 800 may include determining 812 a first time-frequency resource set. In one embodiment, determining 812 the first time-frequency resource set includes determining the first time-frequency resource set based on the NB-IoT CRS frequency offset. In various embodiments, determining 812 the first time-frequency resource set includes determining the first time-frequency resource set based on a PCID derived from a NB-IoT synchronization signal. The method 800 may include receiving 814 the first CRS sequence on the first time-frequency resource set. In one embodiment, the method 800 includes receiving 816 a narrowband physical channel in a second time-frequency resource set, estimating 818 a channel on the second time-frequency resource set based on the first CRS sequence, and demodulating 820 the narrowband physical channel based on the estimated channel, and the method 800 may end.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor that:
   determines a frequency corresponding to a narrowband internet of things ("NB-IoT") carrier;
   determines an NB-IoT cell-specific reference signal ("CRS") frequency offset relative to the frequency;
   determines a first CRS sequence based on the NB-IoT CRS frequency offset and on a Physical Cell ID ("PCID") derived from a NB-IoT synchronization signal, wherein the first CRS sequence is a subset of a second CRS sequence, and the second CRS sequence is a CRS sequence of a long term evolution ("LTE") carrier; and
   determines a first time-frequency resource set; and
a transmitter that transmits the first CRS sequence on the first time-frequency resource set.

2. The apparatus of claim 1, wherein the NB-IoT CRS frequency offset is defined relative to one or more subcarriers.

3. The apparatus of claim 1, wherein the processor determines the first time-frequency resource set based on the NB-IoT CRS frequency offset.

4. The apparatus of claim 1, wherein the transmitter transmits an NB-IoT synchronization signal.

5. The apparatus of claim 4, wherein the processor determines the first time-frequency resource set based on a PCID derived from the NB-IoT synchronization signal.

6. The apparatus of claim 1, wherein the NB-IoT CRS frequency offset is fixed or predetermined.

7. The apparatus of claim 1, wherein the transmitter transmits a narrowband physical channel in a second time-frequency resource set.

8. A method comprising:
determining a frequency corresponding to a narrowband internet of things ("NB-IoT") carrier;
determining an NB-IoT cell-specific reference signal ("CRS") frequency offset relative to the frequency;
determining a first CRS sequence based on the NB-IoT CRS frequency offset and on a Physical Cell ID ("PCID") derived from a NB-IoT synchronization signal, wherein the first CRS sequence is a subset of a second CRS sequence, and the second CRS sequence is a CRS sequence of a long term evolution ("LTE") carrier;
determining a first time-frequency resource set; and
transmitting the first CRS sequence on the first time-frequency resource set.

9. The method of claim 8, wherein the NB-IoT CRS frequency offset is defined relative to one or more subcarriers.

10. The method of claim 8, wherein determining the first time-frequency resource set comprises determining the first time-frequency resource set based on the NB-IoT CRS frequency offset.

11. The method of claim 8, further comprising transmitting the NB-IoT synchronization signal.

12. The method of claim 11, wherein determining the first time-frequency resource set comprises determining the first time-frequency resource set based on a PCID derived from the NB-IoT synchronization signal.

13. The method of claim 8, wherein the NB-IoT CRS frequency offset is fixed or predetermined.

14. The method of claim 8, further comprising transmitting a narrowband physical channel in a second time-frequency resource set.

15. An apparatus comprising:
a processor that:
   determines a frequency corresponding to a narrowband internet of things ("NB-IoT") carrier;
   determines an NB-IoT cell-specific reference signal ("CRS") frequency offset relative to the frequency;
   determines a first CRS sequence based on the NB-IoT CRS frequency offset and on a Physical Cell ID ("PCID") derived from a NB-IoT synchronization signal, wherein the first CRS sequence is a subset of a second CRS sequence, and the second CRS sequence is a CRS sequence of a long term evolution ("LTE") carrier; and
   determines a first time-frequency resource set; and
a receiver that receives the first CRS sequence on the first time-frequency resource set.

16. The apparatus of claim 15, wherein the NB-IoT CRS frequency offset is defined relative to one or more subcarriers.

17. The apparatus of claim 15, wherein the processor determines the first time-frequency resource set based on the NB-IoT CRS frequency offset.

18. The apparatus of claim 15, wherein the receiver receives the NB-IoT synchronization signal.

19. The apparatus of claim 18, wherein the processor determines the first time-frequency resource set based on a PCID derived from the NB-IoT synchronization signal.

20. The apparatus of claim 15, wherein the NB-IoT CRS frequency offset is fixed or predetermined.

21. The apparatus of claim 15, wherein:
the receiver receives a narrowband physical channel within a second time-frequency resource set; and
the processor:
   estimates a channel on the second time-frequency resource set based on the first CRS sequence; and
   demodulates the narrowband physical channel based on the estimated channel.

22. A method comprising:
determining a frequency corresponding to a narrowband internet of things ("NB-IoT") carrier;
determining an NB-IoT cell-specific reference signal ("CRS") frequency offset relative to the frequency;
determining a first CRS sequence based on the NB-IoT CRS frequency offset and on a Physical Cell ID ("PCID") derived from a NB-IoT synchronization signal, wherein the first CRS sequence is a subset of a second CRS sequence, and the second CRS sequence is a CRS sequence of a long term evolution ("LTE") carrier;
determining a first time-frequency resource set; and
receiving the first CRS sequence on the first time-frequency resource set.

23. The method of claim 22, wherein the NB-IoT CRS frequency offset is defined relative to one or more subcarriers.

24. The method of claim 22, wherein determining the first time-frequency resource set comprises determining the first time-frequency resource set based on the NB-IoT CRS frequency offset.

25. The method of claim 22, further comprising receiving the NB-IoT synchronization signal.

26. The method of claim 25, wherein determining the first time-frequency resource set comprises determining the first time-frequency resource set based on a PCID derived from the NB-IoT synchronization signal.

27. The method of claim 22, wherein the NB-IoT CRS frequency offset is fixed or predetermined.

28. The method of claim 22, further comprising:
   receiving a narrowband physical channel within a second time-frequency resource set;
   estimating a channel on the second time-frequency resource set based on the first CRS sequence; and
   demodulating the narrowband physical channel based on the estimated channel.

* * * * *

UNITED STATES PATENT AND TRADEMARK OFFICE
CERTIFICATE OF CORRECTION

PATENT NO. : 10,652,049 B2
APPLICATION NO. : 15/402010
DATED : May 12, 2020
INVENTOR(S) : Zhi Yan and Zukang Shen It is certified that error appears in the above-identified patent and that said Letters Patent is hereby corrected as shown below:

In the Claims

Column 19, Line 36-37, Claim 4:
"The apparatus of claim 1, wherein the transmitter transmits an NB-IoT Synchronization signal."
Should read:
"The apparatus of claim 1 wherein the transmitter transmits the NB-IoT Synchronization signal."

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*